United States Patent
Ma et al.

(10) Patent No.: US 7,315,556 B1
(45) Date of Patent: Jan. 1, 2008

(54) SHARED CODEC IN MULTIPROCESSOR SYSTEMS

(75) Inventors: Zhigang Ma, Bethlehem, PA (US); Brian J. Petryna, Lebanon, NJ (US); Oceager P. Yee, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 770 days.

(21) Appl. No.: 09/629,707

(22) Filed: Jul. 31, 2000

(51) Int. Cl.
*H04J 3/02* (2006.01)
(52) U.S. Cl. .................. 370/540; 370/535; 370/537
(58) Field of Classification Search ................ 370/294, 370/321, 347, 442, 465, 470, 537, 535, 538, 370/539, 540, 541, 542, 543, 544, 545
See application file for complete search history.

(56) References Cited

U.S. PATENT DOCUMENTS

| | | | | |
|---|---|---|---|---|
| 5,771,393 A | * | 6/1998 | Asghar et al. | 710/1 |
| 5,790,817 A | * | 8/1998 | Asghar et al. | 710/311 |
| 5,838,664 A | * | 11/1998 | Polomski | 370/263 |
| 6,124,882 A | * | 9/2000 | Voois et al. | 348/14.08 |
| 6,230,026 B1 | * | 5/2001 | Schwaller et al. | 455/561 |
| 6,256,608 B1 | * | 7/2001 | Malvar | 704/230 |
| 6,735,734 B1 | * | 5/2004 | Liebetreu et al. | 714/775 |

FOREIGN PATENT DOCUMENTS

WO    WO 97/23078    * 6/1997

* cited by examiner

*Primary Examiner*—Wellington Chin
*Assistant Examiner*—Mark A. Mais

(57) ABSTRACT

A single coder/decoder shared among several multiprocessors in a digital signal processing system through time-division multiplexing between multiple processors to enhance signal processing capabilities by assigning different digital-to-analog channels to different processors for digital-to-analog conversion, while allowing all processors to operate on the same analog-to-digital data for analog-to-digital conversion, thereby resulting in chip area reduction and power consumption saving.

6 Claims, 2 Drawing Sheets

SHARED CODEC IN MULTIPROCESSOR SYSTEMS

BACKGROUND OF THE INVENTION

1. Field of the Invention

This invention relates to digital signal processing applications and, more particularly, to such applications in which a coder/decoder (CODEC) is employed to convert analog signals into a digital format (A/D conversion) to be manipulated with signal processing algorithms, and which is used to convert digital data back to analog form (D/A conversion) to be outputted.

2. Description of the Related Art

As is known, many applications require a coder/decoder of this type to convert more than one signal path—such as in telephony applications where conversion channels are oftentimes employed for speech processing, ring detection and battery monitoring. In a typical usage, a single processor interfaces either to a single CODEC in the processing system or to multiple CODECs. Where a single CODEC is employed, its design includes multiple channels which are time-division multiplexed amongst the various signal paths. Where multiple CODECs are used, on the other hand, a more expensive system results—making the configuration generally unacceptable for consumer uses. Where the signal processing functions, furthermore, are handled by single processor, the performance of the system becomes reduced as bandwidth is consumed in transferring data back-and-forth between processors. Limitations thus follow in employing a single processor with multiple CODECs, or when employing multiple processors with either a single CODEC or a multiple CODEC system.

SUMMARY OF THE INVENTION

As will become clear from the following description, the present invention describes a digital signal processing system which provides signal processing capabilities to multi-processor systems by time-division multiplexing the conversion channels for a single CODEC among the various processors in the system. As will be more clearly seen, the D/A conversion channels are time-division multiplexed among the various processors, while the A/D conversion channels are accessible from any processor in the system. This follows from a recognition that because only one processor can send data to be converted to each analog output to be useful, multiple processors can operate on the same piece of data from the A/D conversion.

In accordance with a preferred embodiment of the invention—to be described below—, one processor is allocated to designate which processor controls which channel. That allocated processor then controls when the digital data is to be sent to the CODEC, and assures that the digital data coming back from the CODEC is sent to all the processors to be operated upon. In converting in one direction, then, the digital signal processing system of the invention will be seen to be selective; however, proceeding in the opposite conversion direction, the multiple processors will be seen to operate on the same bit of data. With the invention, therefore, a single CODEC is shared, being time-division multiplexed between multiple processors to enhance signal processing capabilities by assigning different digital-to-analog conversion channels to different processors for digital-to-analog conversion, while allowing all processors to operate on the same analog-to-digital data for analog-to-digital conversion, thereby resulting in chip area reduction and power consumption saving.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE INVENTION

Figure 1:
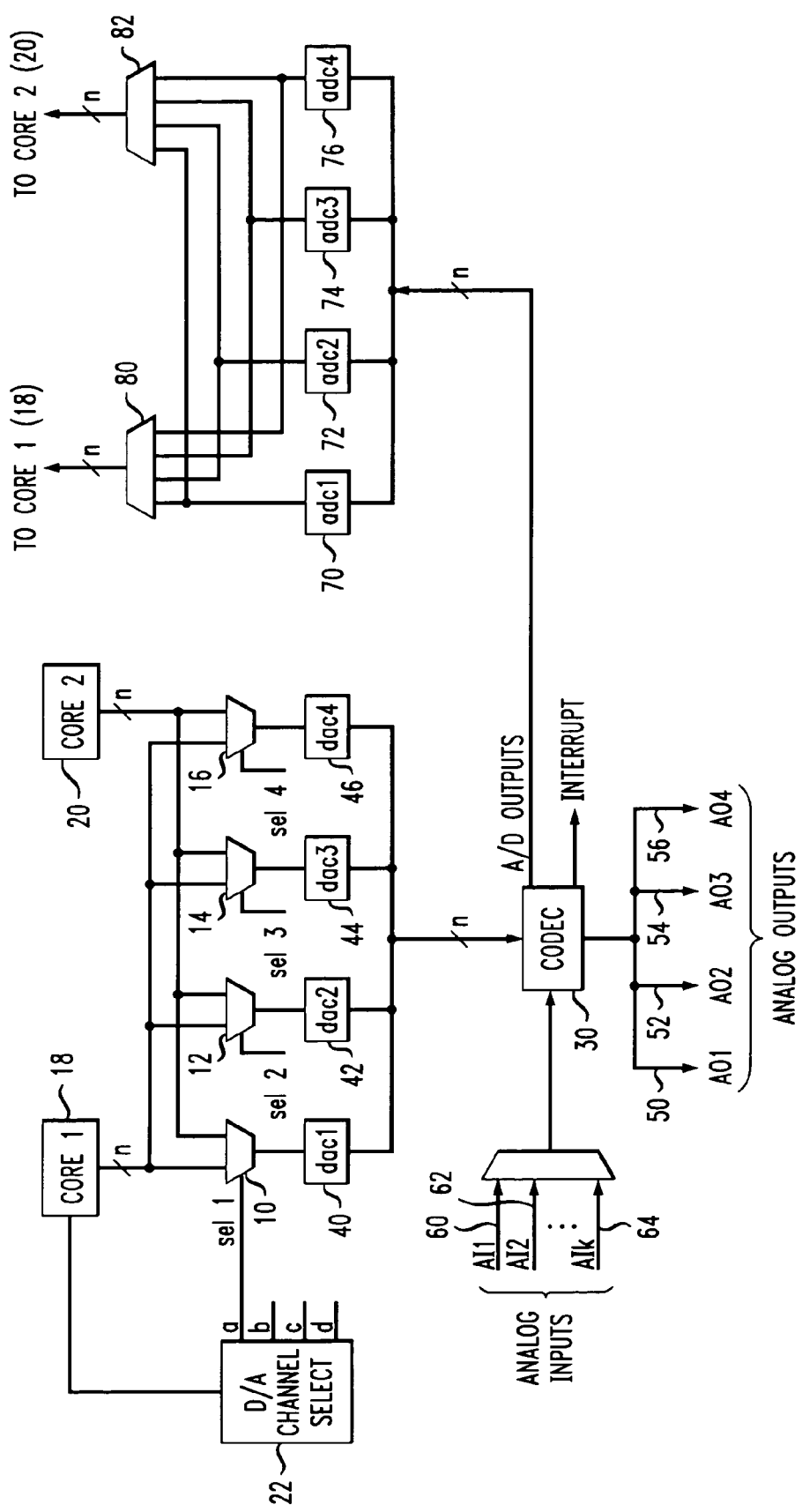
FIG. 1 is a block diagram illustration of the shared CODEC system of the present invention.

In FIG. 1, a digital signal processing system operative with four A/D-D/A conversion channels are set out, although the number of channels may be selected as needed, indicated by the "n" notation. Designated by the reference numerals 10, 12, 14, 16 are four multiplexers, operative with a pair of abstract representations CORE 1 and CORE 2 (18 and 20)—either as a digital signal processing core or as a micro-controller core as the case may be. On "power up" or on "reset", a main processor 22 assigns which of the multiplexers 10, 12, 14, 16 in the system of FIG. 1 is to send digital signals to each of the D/A channels in the single coder/decoder 30. FIG. 1 illustrates the connection when the main processor 22 selects the multiplexer 10 (sel 1) while the designations "sel 2", "sel 3", and "sel 4", represent the respective controls for the multiplexers 12, 14 and 16 for outputs connected to terminals B, C and D of main processor 22, where terminal A connects directly to multiplexer 10. A plurality of registers 40, 42, 44, 46 are included to buffer the data from the core units 18, 20 for storing the digital to analog data, and for latching the data before it is coupled to the coder 30. The multiplexed analog outputs from the CODEC 30 are shown at 50, 52, 54, 56 as AO1, AO2, AO3 and AO4 respectively. In operation, the controls sel 1, sel 2, sel 3 and sel 4 are configured to select the multiplexers 10, 12, 14 or 16 to select either of CORE 1 (18) or CORE 2 (20) to interface with the dac1, dac2, dac3 or dac4 registers 40, 42, 44, 46 to channel the digital data to the CODEC 30 to be converted to the respective analog output.

In accordance with the invention, the main processor 22 also determines which of the three illustrative analog input signals at 60, 62 and 64 (AI1, AI2 and AIK, respectively), is to be used for the A/D conversion in CODEC 30. The A/D outputs from CODEC 30 are then coupled concurrently through their registers 70, 72, 74, 76 (adc1, adc2, adc3 and adc4) through the demultiplexers 80, 82 back to the CORE 1 and CORE 2 units 18, 20. These demultiplexers allow each core to select which A/D channels the core will read from.

As will be appreciated, by sharing the single CODEC 30 amongst several processors in this manner, a significant reduction in chip area results, along with a savings in power consumption. And, with the two sets of registers employed (40, 42, 44, 46 and 70, 72, 74, 76), the processors described are able to read the data from one register while the CODEC 30 is updating the analog/digital data through the other registers. At the end of a CODEC frame, the contents from the first set of registers can then be transferred to the second set of registers so that the CORES can continuously read from the CODEC 30 without the possibility of meta instability states.

Figure 2:
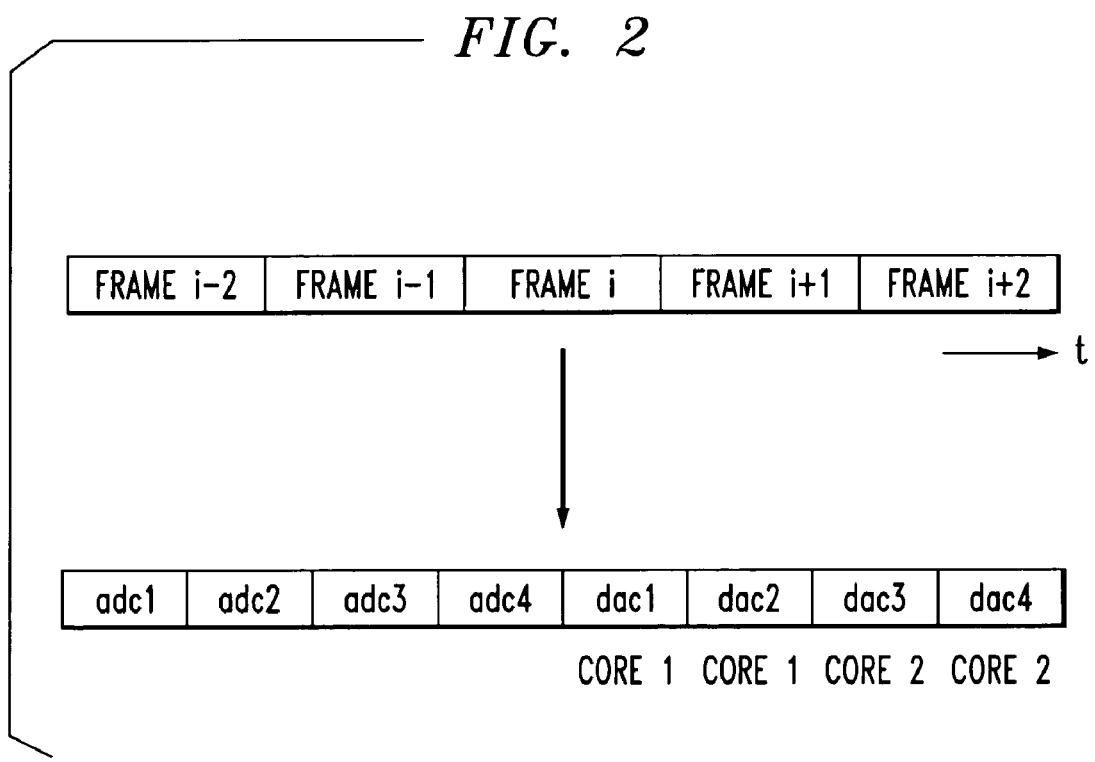
FIG. 2 illustrates a CODEC frame helpful in an understanding of the operation of the time-division multiplexing of the invention.

FIG. 2 represents an example of a frame in the described shared CODEC system of the invention in which the operation of the CODEC is time-division multiplexed between the A/D and D/A channels. In this respect, the CODEC 30 incorporates internal counters (as is known) to count the number of cycles in a frame, at the end of which an "interrupt pulse" is generated. Such "interrupt pulse" is synchronized to the clock of each core before being applied to the respective core's interrupt circuitry. Upon receiving an interrupt, each core will then be able to know when the CODEC has completed processing a frame. At this point, the core can process A/D data, or send out D/A data for the next frame by writing to a dac register.

Considering, as an example, that CORE 1 is in control of the first two D/A channels and CORE 2 is in control of the remaining two channels, multiple D/A and A/D conversions operate with the present invention, at the same time. That is, with the time-division multiplexing afforded by the main processor 22, a small amount of time is first reserved for the A/D by register 70 (adc1), followed by small amounts of time for A/D conversion by registers 72 (adc2), 74 (adc3) and 76 (adc4) in turn; then for the following D/A conversion, a small amount of time is required through registers 40, 42, 44 and 46 (dac1, dac2, dac3 and dac4), in turn. A shift to CORE 2 for register 44 (dac3) and for register 46 (dac4) follows, as indicated, for the assumed assignment of the D/A conversion for the illustrated period from CORE 1 by way of the D/A channel select processor 22. The frame indications i−1, i−2, i+1 and i+2 are representative of the frame structure for the CODEC—with each frame producing basically a sample point arranged so that frame i−1 builds in a sample point for the previous frame while i+1 builds in a sample point for the next frame; during the previous frame or during a subsequent frame, the same type of processing arises as for frame i. For the other frame indicated, a similar structure exists as for the frame i, with the A/D conversions all being the same for the D/A assignments shown as illustrated by the channel select processor 22. At the end of every frame, an interrupt is generated to all the processors in the system for this described operation. Since the A/D data is double-buffered through the adc registers 70, 72, 74 and 76, either of the CORES 1 and 2 can read the A/D data at any time; the double-buffering, furthermore, allows the CORES 1 and 2 to write D/A data to the dac registers 40, 42, 44 and 46 for use in the next following CODEC frame.

While there has been described what is considered to be a preferred embodiment of the present invention, it will be readily understood by those skilled in the art that modifications can be made without departing from the scope of the teachings herein of employing a shared CODEC in the multiprocessor signal processing system to enhance signal processing capabilities by time-division multiplexing between multiple processors through assigning different digital-to-analog channels to different processors for D/A conversion, while allowing multiple processors to operate concurrently on the same analog-to-digital data. For at least such reason, therefore, resort should be had to the claims appended hereto for a true understanding of the scope of the invention.

We claim:

1. In a multiprocessor digital signal processing system, comprising:
    a plurality of processors;
    a single coder/decoder to selectively output an encoded signal to said plurality of processors through a time division multiplexed channel connecting said single coder/decoder to said plurality of processors;
    a processor to selectively input to said coder/decoder one of a plurality of analog signals;
    means for individually selecting input digital signals and analog signals for digital/analog conversion and analog/digital conversion, respectively; and
    means for assigning which of said plurality of processors is coupled to said single digital/analog conversion channel.

2. The digital signal processing system according to claim 1, further comprising:
    a plurality of registers to buffer digital signal data from said single coder/decoder to each of said first plurality of processors.

3. The digital signal processing system according to claim 2, further comprising:
    means for individually selecting time slots for digital signals from each of said first plurality of processors to access said digital signal input of said coder/decoder.

4. A digital signal processing system comprising:
    a single coder/decoder to communicate with a single digital/analog conversion channel, and to communicate with a single analog/digital conversion channel;
    a processor to selectively input one of a plurality of digital signals and to selectively input one of a plurality of analog signals to said coder/decoder;
    a first source of an analog input signal coupled to said analog signal input of said single coder/decoder;
    a second source of digital input signals coupled to said digital signal input of said single coder/decoder;
    a first plurality of processors multiplexed to said single coder/decoder; and
    means for time division multiplexing said first plurality of processors to said single coder/decoder.

5. A digital signal processing system comprising:
    a single coder/decoder to communicate with a single digital/analog conversion channel, and to communicate with a single analog/digital conversion channel;
    a processor to selectively input one of a plurality of digital signals and to selectively input one of a plurality of analog signals to said coder/decoder;
    a first source of an analog input signal coupled to said analog signal input of said single coder/decoder;
    a second source of digital input signals coupled to said digital signal input of said single coder/decoder;
    a first plurality of processors multiplexed to said single coder/decoder;
    means for time division multiplexing said first plurality of processors to said single coder/decoder; and
    a second plurality of processors coupled to a digital output of said single coder/decoder for operating on said single analog-to-digital converted signal.

6. A digital signal processing system, comprising:
    a single coder/decoder to communicate with a single digital/analog conversion channel, and to communicate with a single analog/digital conversion channel;

a processor to selectively input one of a plurality of digital signals and to selectively input one of a plurality of analog signals to said coder/decoder; a first source of an analog input signal coupled to said analog signal input of said single coder/decoder;

a second source of digital input signals coupled to said digital signal input of said single coder/decoder;

a first plurality of processors multiplexed to said single coder/decoder;

means for time division multiplexing said first plurality of processors to said single coder/decoder;

a second plurality of processors coupled to a digital output of said single coder/decoder for operating on said single analog-to-digital converted signal; and a register to buffer digital signal data for use by said digital signal input of said single coder/decoder.

* * * * *